(12) United States Patent
Murthy et al.

(10) Patent No.: US 6,947,950 B2
(45) Date of Patent: Sep. 20, 2005

(54) TECHNIQUES FOR MANAGING MULTIPLE HIERARCHIES OF DATA FROM A SINGLE INTERFACE

(75) Inventors: Ravi Murthy, Fremont, CA (US); Eric Sedlar, San Francisco, CA (US); Nipun Agarwal, Santa Clara, CA (US)

(73) Assignee: Oracle International Corporation, Redwood Shores, CA (US)

(*) Notice: Subject to any disclaimer, the term of this patent is extended or adjusted under 35 U.S.C. 154(b) by 241 days.

(21) Appl. No.: 10/305,990

(22) Filed: Nov. 26, 2002

(65) Prior Publication Data

US 2004/0088306 A1 May 6, 2004

Related U.S. Application Data

(60) Provisional application No. 60/424,543, filed on Nov. 6, 2002.

(51) Int. Cl.[7] .............................................. G06F 17/30
(52) U.S. Cl. .................................................. 707/103 R
(58) Field of Search .................. 707/3–5, 103 R–103 Y, 707/103 Z, 100, 102, 10, 2, 101, 200; 345/625; 715/514, 746; 719/313; 709/219, 223, 225; 713/171

(56) References Cited

U.S. PATENT DOCUMENTS

| | | | |
|---|---|---|---|
| 5,404,513 A | | 4/1995 | Powers et al. |
| 5,463,772 A | | 10/1995 | Thompson et al. |
| 5,680,614 A | | 10/1997 | Bakuya et al. |
| 5,974,407 A | | 10/1999 | Sacks |
| 6,055,544 A | | 4/2000 | DeRose et al. |
| 6,128,610 A | * | 10/2000 | Srinivasan et al. ............ 707/3 |
| 6,141,655 A | | 10/2000 | Johnson et al. |
| 6,208,993 B1 | | 3/2001 | Shadmone |
| 6,236,988 B1 | | 5/2001 | Aldred |
| 6,279,007 B1 | | 8/2001 | Uppala |
| 6,370,537 B1 | | 4/2002 | Gilbert et al. |
| 6,470,344 B1 | | 10/2002 | Kothuri et al. |

(Continued)

FOREIGN PATENT DOCUMENTS

| | | |
|---|---|---|
| EP | 1 241 589 A2 | 9/2002 |
| WO | WO 00/49533 | 8/2000 |
| WO | WO 01/59602 A1 | 8/2001 |
| WO | WO 01/61566 A1 | 8/2001 |

OTHER PUBLICATIONS

Al–Khalifa, S. et al, Structural joins: a primitive for efficient XML query pattern matching, Feb. 26–Mar. 1, 2002, Data Engineering, 2002. Proceedings. 18th International Conference, pp. 141–152.*

(Continued)

*Primary Examiner*—Diane D. Mizrahi
(74) *Attorney, Agent, or Firm*—Hickman Palermo Truong & Becker LLP

(57) ABSTRACT

Techniques for managing multiple hierarchies of data from a single native hierarchy include registering a set of routines for each foreign hierarchy. The set of routines performs a set of operations on data in the hierarchy associated with a node. A user request is received, which indicates a particular operation on particular data that does not correspond to a node of the native hierarchy. Based on the user request, a first operation on a first set of one or more nodes of a first hierarchy that is not the native hierarchy is determined. A particular routine that corresponds to the first operation is selected from a first set of routines registered for the first hierarchy, and is invoked. These techniques allow a user to employ a consistent interface with the native hierarchy to reach data in any of the hierarchies.

22 Claims, 4 Drawing Sheets

U.S. PATENT DOCUMENTS

| | | | |
|---|---|---|---|
| 6,487,546 | B1 | 11/2002 | Witkowski |
| 6,496,842 | B1 | 12/2002 | Lyness |
| 6,604,100 | B1 * | 8/2003 | Fernandez et al. ............. 707/3 |
| 6,611,843 | B1 * | 8/2003 | Jacobs ........................ 707/102 |
| 6,681,221 | B1 * | 1/2004 | Jacobs .......................... 707/5 |
| 6,704,739 | B2 | 3/2004 | Craft et al. |
| 6,704,747 | B1 | 3/2004 | Fong |
| 6,725,212 | B2 | 4/2004 | Couch et al. |
| 2002/0056025 | A1 | 5/2002 | Qui et al. |
| 2002/0133484 | A1 | 9/2002 | Cháu et al. |
| 2003/0004937 | A1 | 1/2003 | Salmenkaita et al. |
| 2003/0009361 | A1 | 1/2003 | Hancock et al. |
| 2003/0065659 | A1 | 4/2003 | Agarwal et al. |
| 2003/0084056 | A1 * | 5/2003 | DeAnna et al. ............. 707/100 |
| 2003/0101194 | A1 | 5/2003 | Rys et al. |
| 2004/0043758 | A1 | 3/2004 | Sorvari et al. |
| 2004/0103282 | A1 * | 5/2004 | Meier et al. ................ 713/171 |
| 2004/0176958 | A1 | 9/2004 | Salmenkaita et al. |
| 2004/0225680 | A1 | 11/2004 | Cameron et al. |

OTHER PUBLICATIONS

Wolfgang May, "Querying Linked XML Document Networks in the Web", The Eleventh International WWW Conference, May 7, 2002, XP002300873, Honolulu Hawaii, USA, http://www2002.org/CDROM/alternet/index–bytitle.html, 8 pgs.

PCT Written Opinion, date of mailing Nov. 10, 2004 for International Application No. PCT/US 03/35552; 6 pages.

Claims from PCT/US 03/35552; pp. 25–27.

Chakraborty, Krishnendu, "The XML Garbage Collector", The Source for Developers, Sun Developer Network Site XP–002297849, Mar. 2002.

Written Opinion, Application No. PCT/US03/35551 (8 pages).

Current claims in PCT/US03/35551, pp. 20–23.

Hansrudi Noser, et al., "Dynamic 3D Visualization of Database–Defined Tree Structures on the WWW by Using Rewriting Systems," 2000, IEEE, XP–002262516, pp. 247–254.

Sushil Jajodia, et al., "Toward a Multilevel Secure Relational Data Model," ACM, 1991, 8393 SIGMOD Record, 20 (1991) Jun., No. 2, New York, US, XP 000364619, pp. 50–59.

R. Bourret, et al., "A Generic Load/Extract Utility For Data Transfer Between XML Documents and Relational Databases," Proc. Second International Workshop on Advanced Issues of E–Commerce and Web–Based Information Systems, IEEE Computing Society, Jun. 8–9, 2000, pp. 134–143.

S. Vorthmann, et al. "Beyond Schemas, Schema Adjuncts and the Outside World," Markup Languages, Online!, vol. 2, No. 3, Jun. 2000, pp. 1–8.

Mi–Ok Chae, et al., "Design and Implementation of an Object–Oriented Multimedia DBMS Tightly Coupled with Information Retrieval Functions," Proc. 17th IASTED International Conference on Applied Informatics, Feb. 15–18, 1999, abstract.

Josephine Cheng, et al., "IBM DB2 XML Extender, An end–to–end solution for storing and retrieving XML documents.," IEEE, 2000, ICDE '00 Conference, San Diego, Feb. 2000, 128 pages.

Chen, Ruey–Shun et al., "Developing an XML framework for metadata system", Trinity College Dublin, Proc. of the 1st Inter. Sympo. on Information and Communication, pp. 267–272.

Manolescu, Dragos, Review of "Metadata solutions: using metamodels, repositories, XML, and enterprise portals to generate information on demand by Adrienne Tannebaum", Mar. 2003, ACM Press, vol. 28, Issue 2, p. 38.

Notification of Transmittal of the International Preliminary Examination Report received in corresponding PCT international application. No. PCT/US03/35552.

* cited by examiner

TECHNIQUES FOR MANAGING MULTIPLE HIERARCHIES OF DATA FROM A SINGLE INTERFACE

CROSS REFERENCE TO RELATED APPLICATIONS

This application claims benefit of Provisional Appln. 60/424,543, filed Nov. 6, 2002, the entire contents of which are hereby incorporated by reference as if fully set forth herein, under 35 U.S.C. §119(e).

This application is related to U.S. patent application Ser. No. 10/306,485, hereinafter referenced as Agarwal, filed Nov. 26, 2002, the entire contents of which are hereby incorporated by reference as if full set forth herein.

FIELD OF THE INVENTION

The present invention relates to techniques for managing hierarchical data, and, in particular, to techniques for managing multiple hierarchies of data from a single integrated interface.

BACKGROUND OF THE INVENTION

Some data are naturally organized as hierarchies. Hierarchies are well-known mathematical constructs. In general, a hierarchy is composed of nodes at multiple levels. The nodes at each level are each linked to one or more nodes at a different level. Each node at a level below the top level is a child node of one or more of the parent nodes at the level above. In a tree hierarchy, each child node has only one parent node, but a parent node may have multiple child nodes. In a tree hierarchy, a node that has no parent node linked to it is the root node, and a node that has no child nodes linked to it is a leaf node. A tree hierarchy typically has a single root node.

For example, a flexible file system used by a computer operating system to store contents on a computer readable medium is often organized into a hierarchy of "folders" or "directories." Each folder can contain any number of files that store data on a computer readable medium and any number of other folders. The folder that contains the files and other folders is the parent node of those files and folders. The files and other folders are the child nodes of that folder. The system typically has one root folder.

Also, data elements in the extensible markup language (XML) are arranged into a tree hierarchy. XML is widely used to store data and exchange data between independent applications. Each data element in XML may be composed of zero or more child elements. Each element also has an element name and zero or more additional element attributes. The XML document is the single root element.

While convenient for many purposes, operations on data organized by hierarchies, such as file systems and XML documents, can be difficult to express. Operations may include, for example, creating, retrieving data from, writing data to, copying, moving and deleting the nodes of the hierarchies, such as files or XML elements. The expression of the nodes and operations may vary from one hierarchical data system to another. It would be convenient to operate on data spread among multiple hierarchies with a single integrated interface that uses a single set of expressions for the nodes and operations.

In one approach, nodes from multiple hierarchies are assembled into one system with an established and convenient interface that functions on a user's equipment (called hereinafter the user's "native system"). For example, in one native system, nodes in a hierarchy are stored in a node table in a relational database, and the parent-child relationships are stored in a hierarchical index. Such an index may list, for example, every parent node, and for each parent node, all of the child nodes that are immediately below the parent node in the hierarchy. In such a system, SQL commands can be used to list the nodes that satisfy certain criteria. Operations on the nodes can be performed by one or more stored procedures.

Maintaining a node table and hierarchical index in this manner enables one to use an SQL query on a file system to find the path from a root folder to a particular folder or file that satisfies certain criteria on the folder or file attributes. For example, one can get the file names and the paths from the root folder for all files that are owned by user Scott and were created between Jan. 1, 2001 and Jan. 10, 2001, assuming "owner" and "creation date" are attributes of the files in the node table. Then, one can copy those files to a new folder or otherwise operate on those files.

While this approach works well for many kinds of data organized in hierarchies, the approach has some shortcomings. For example, in many cases, the non-native (i.e., foreign) hierarchical data systems provide resources for storing and retrieving the data. To import that data into the native system causes the native system to devote its own resources to store data that are already stored elsewhere. This can greatly increase the expense of maintaining the native system.

Furthermore, the number of nodes in the foreign systems may be large, yet the users of the native system may wish to operate on those nodes infrequently. Importing all those nodes into the native system may bloat the hierarchical index of the native system. A bloated index can lead to increased response time and overall degraded performance by the native system.

In addition, incorporating a new foreign system consumes resources on the user's systems that increase with the amount of data in the new foreign system. The data contents of the new system have to be copied from the new system to the native system, and the native indexes have to be updated. Similarly, detaching a foreign system also consumes resources that increase with the amount of the data in the foreign system. The data contents may have to be deleted from the native system and the native indexes have to be updated. If the contents of the foreign system are changed, the native system may have to both detach the old version of the foreign system and incorporate the new version. Consuming so many resources to attach and detach foreign systems can lead to overall degraded performance by the native system.

Furthermore, there may be aspects of data security that preclude importing the foreign data into the native system. For example, the foreign system may control access to data in the foreign hierarchy based on an unusual or proprietary security model that might be difficult or impermissible to express or enforce in the native system.

Based on the foregoing, there is a clear need for techniques to manage hierarchical data in multiple hierarchies with a single interface, which do not suffer the above deficiencies. In particular, there is a need for techniques to manage data distributed among multiple hierarchies with a single interface without importing all the data into a single hierarchical data system.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF SUMMARY OF AN EMBODIMENT OF THE INVENTION

According to one embodiment, a technique for managing multiple hierarchies of data containers from a single native hierarchy includes:

Register a set of routines for each hierarchy that is not the native hierarchy. For each hierarchy, the set of routines performs a set of operations on a data container in the hierarchy.

Receive a user request that indicates a particular operation on a particular data container that does not correspond to a node of the native hierarchy.

Based on the user request, determine a first operation on a first set of one or more data containers of a first hierarchy that is not the native hierarchy.

Select a particular routine that corresponds to the first operation from a first set of routines registered for the first hierarchy during the register step.

Invoke the particular routine to operate on the first set of one or more data containers.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF THE INVENTION

Techniques are described for managing data containers arranged in multiple hierarchies. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following, embodiments of the invention are described in the context of managing multiple hierarchical file systems from a native hierarchical file system stored in a relational database. However, the techniques and mechanisms described herein are not limited to this context. In other embodiments, the native system is another management system for a hierarchy of data containers.

As used herein, the term "data container" designates the data associated with a node, whether that data is a folder, a file, an XML element, or some other grouping of data in the hierarchy, such as an entry in one or more columns of a relational database table. In some embodiments, other hierarchical data, such as an XML document, may form one or more of the hierarchies of data containers.

According to one embodiment, a technique for managing multiple hierarchies of data containers from a single native hierarchy includes:

Register a set of routines for each hierarchy that is not the native hierarchy. For each hierarchy, the set of routines performs a set of operations on a data container in the hierarchy.

Receive user requests that indicate a particular operation on a particular data container that does not correspond to a node of the native hierarchy.

Based on the user request, determine a first operation on a first set of one or more nodes of a first hierarchy that is not the native hierarchy.

Select a particular routine that corresponds to the first operation from a first set of routines registered for the first hierarchy during the registering step.

Invoke the particular routine to operate on the first set of one or more nodes.

The techniques described herein allow a user to employ a consistent interface with the native hierarchy in order to reach a data container in any of the hierarchies registered with the system that manages the native hierarchy. Because registered functions are invoked to reach foreign data containers, the data contained in the foreign data containers do not need to be incorporated into the native hierarchy. Thus, fewer resources of the system that manages the native hierarchy are consumed for searching the data in the foreign data containers or for incorporating or detaching the contents of all the foreign data containers.

Example Hierarchical File Systems

Figure 1:
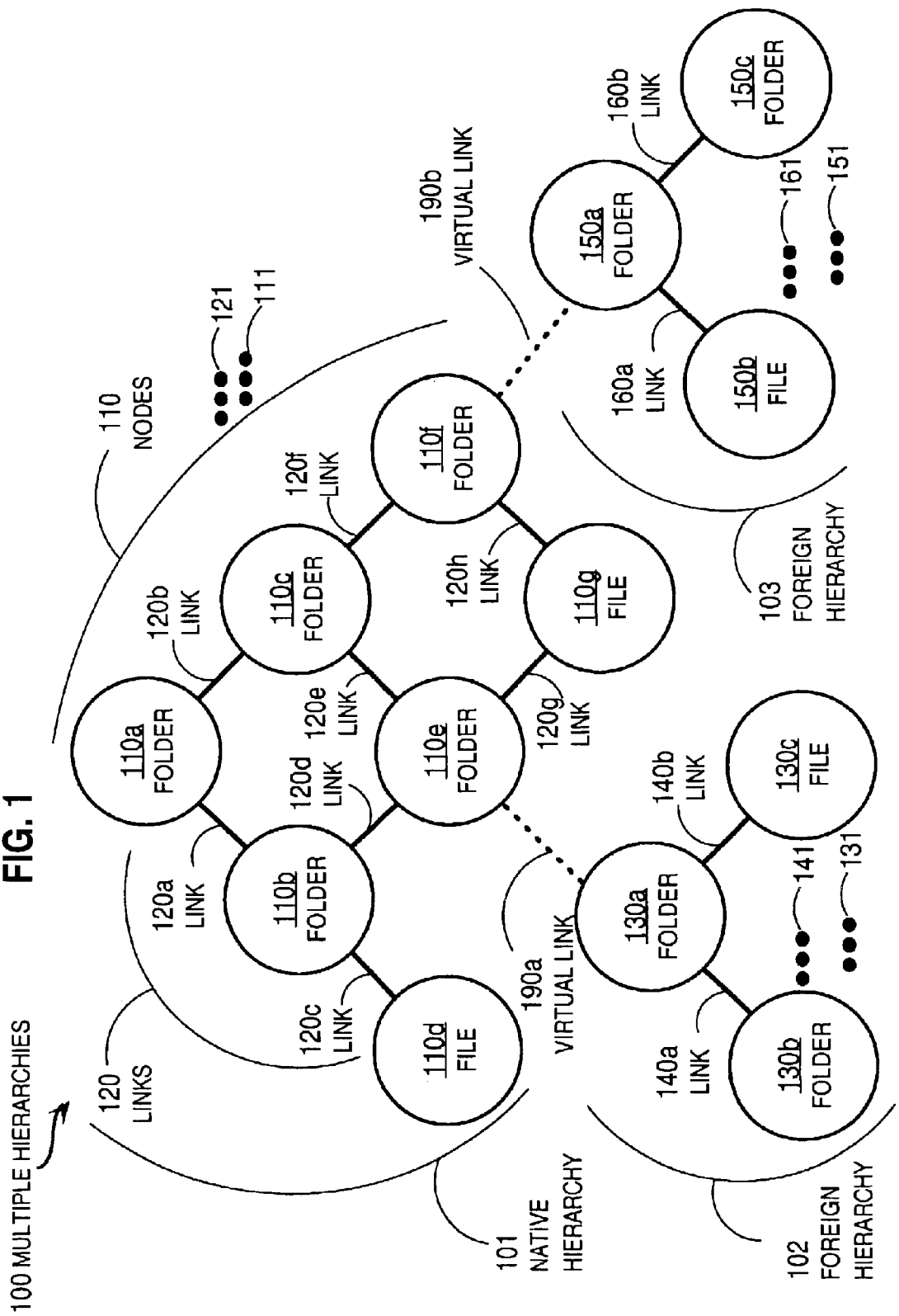
FIG. 1 is a block diagram that illustrates multiple hierarchies of nodes and links in multiple file systems, according to an embodiment.

FIG. 1 is a block diagram that illustrates multiple hierarchies 100 of nodes and links in multiple file systems, according to an embodiment. A native hierarchy 101 includes multiple nodes 110 that each corresponds to a folder or a file in a native file system. Nodes 110a, 110b, 110c, 110e, 110f, correspond to folders in the file system and are parent nodes to one or more other nodes; and nodes 110d, 110g, correspond to files in the file system, which are always leaf nodes that are not parents to any other nodes. The term "resource" is used hereinafter to refer to an item that may be either a folder or a file; thus all nodes 110 correspond to resources. Ellipsis 111 indicates other nodes 110 in the hierarchy 101 that correspond to other resources in the file system.

The nodes 110 are connected to other nodes 110 by links 120. A link 120 associates one node 110 with a different, single node 110. Link 120a associates parent node 110a with child node 110b. Similarly, links 120b, 120c, 120d, 120e, 120f, 120g, and 120h associate one parent node 110 with one child node 110. Ellipsis 121 indicates other links 120 in the hierarchy 101 that correspond to one-to-one associations among other resources in the file system.

FIG. 1 also depicts two foreign hierarchies 102, 103, which include resources managed in two independent, foreign file systems. Foreign hierarchy 102 includes nodes 130a, 130b, and 130c, among other nodes indicated by ellipsis 131, collectively referenced hereinafter as foreign nodes 130, that each correspond to a resource in one of the foreign filing systems. Nodes 130a and 130b correspond to folders in the foreign file system and are parent nodes to one or more other nodes; and node 130c corresponds to a file in the foreign file system, which is a leaf node. Foreign hierarchy 102 includes links 140a, and 140b, among other links indicated by ellipsis 141, collectively referenced hereinafter as foreign links 140.

Foreign hierarchy 103 includes nodes 150a, 150b, and 150c, among other nodes indicated by ellipsis 151, collectively referenced hereinafter as foreign nodes 150, that each correspond to a resource in a second foreign filing system. Nodes 150a and 150c correspond to folders in the second foreign file system and are parent nodes to one or more other nodes; and node 150b corresponds to a file in the foreign file system, which is a leaf node. Foreign hierarchy 103 includes links 160a, and 160b, among other links indicated by ellipsis 161, collectively referenced hereinafter as foreign links 160.

Each node 110, 130, 150 has one or more attributes that correspond to properties of the corresponding resource. For example, node attributes may correspond to one or more of a resource name, a resource type (indicating whether file or folder, or indicating a file type or a folder type), a resource creation date, a resource modification date, a resource owner, a resource size, and a list of one or more resource authors, among other properties of the resource.

Each link 120, 140, 160 has one or more attributes that describe the association between the nodes that the link connects. For example, link attributes may correspond to one or more of a link name, a link type (indicating, for example whether the link represents a parent-child relationship or another relationship, such a sibling relationship, a grandparent-grandchild relationship, or an aunt-niece relationship), a link creation date, a link modification date, a link owner, a link owner type (e.g., a soft link with only one owner who creates or deletes the child, or a hard link with multiple owners any of whom may create and all of whom must delete the child), and a link descriptive text, among other properties of the link.

In many file systems, all links are implied. The implied links are of the same types (e.g., parent-child soft links), have no names independent of the nodes, and do not have any other attributes.

A path represents a sequence of links from one node (start node) to another node (finish node) in a hierarchy. Any method known in the art to specify the path may be used. Often, a path is specified by a path name that lists the links between the start node and the finish node. In many file systems, a path name is constructed by combining link names of the links, separated by a delimiting set of one or more special characters, in the order of traversal from start node to finish node. Often the start node is the root node of the hierarchy. For example, a path from folder 110a to file 110d is given by the path name:

/L120a/L120c where LX denotes the name of the link "X", where X is replaced by the numeral representing the link in FIG. 1; and the character "/" is used to delimit the link names. In file systems that employ implied links, or, at least, implied link names, the name of the parent node and child node associated with the link is used instead of the link name. In a path name, the name of an intermediate node along the path is not repeated for its role as the child in one link and the parent in the next link, but is used only once. In such a file system, the path from folder 110a to file 110d is given by the path name:

/N110a/N110b/N110d where NY denotes the name of the node "Y", where Y is replaced by the numeral representing the node in FIG. 1.

A path is useful as output from the relational database system, because resources in different folders can have the same name, and those resources are distinguished by the paths leading to them. A particular resource is indicated by the path name and the resource name. The file systems operate on data (such as data in a file or lists of files in a folder) from the resource uniquely specified by the path.

As shown in FIG. 1, in some hierarchies, there may be more than one path leading to the same node. For example, three paths lead to file 110g from the root node 110a:

/L120a/L120d/L120g

/L120b/L120f/L120h

/L120b/L120e/L120g

Hierarchies in which more than one path leads to a child node are said to include cycles. Such hierarchies are represented as graphs rather than as trees.

FIG. 1 also depicts two virtual links, 190a and 190b, hereinafter referenced collectively as virtual links 190. A virtual link 190 includes a reference to a foreign file system that manages a foreign hierarchy. The virtual link 190 renders a folder in the native hierarchy as a parent node for a node of the foreign hierarchy.

Functional Overview

According to embodiments of the invention, resources 130, 150 and links 140, 160 in the foreign hierarchies 102, 103 are considered virtual resources in the native hierarchy 101. The foreign hierarchies 102, 103 are connected to the native hierarchy through corresponding virtual links, 190a, 190b, collectively referenced hereinafter as virtual links 190. Functions, to perform a set of basic file system operations on resources and links in a foreign hierarchy, are registered for each foreign hierarchy connected by a virtual link 190.

When traversing one of the virtual links from a native folder to a virtual resource during an operation involving a target virtual resource, one of the registered functions is invoked. The registered function that is invoked corresponds to a particular operation to perform on the target virtual resource. An input parameter of the invoked function indicates the target virtual resource.

By invoking registered functions, file systems operations can be performed on nodes and links in the foreign file systems without importing those nodes or links into the native file system. Since nodes and links are not imported into the native system, the native system does not expend native system resources to manage these foreign nodes and links. This allows a user to employ a consistent interface with the native hierarchy in order to reach a data container in any of the foreign hierarchies registered with the native hierarchy without importing the nodes or links of the foreign file system.

Structural Overview

Figure 2:
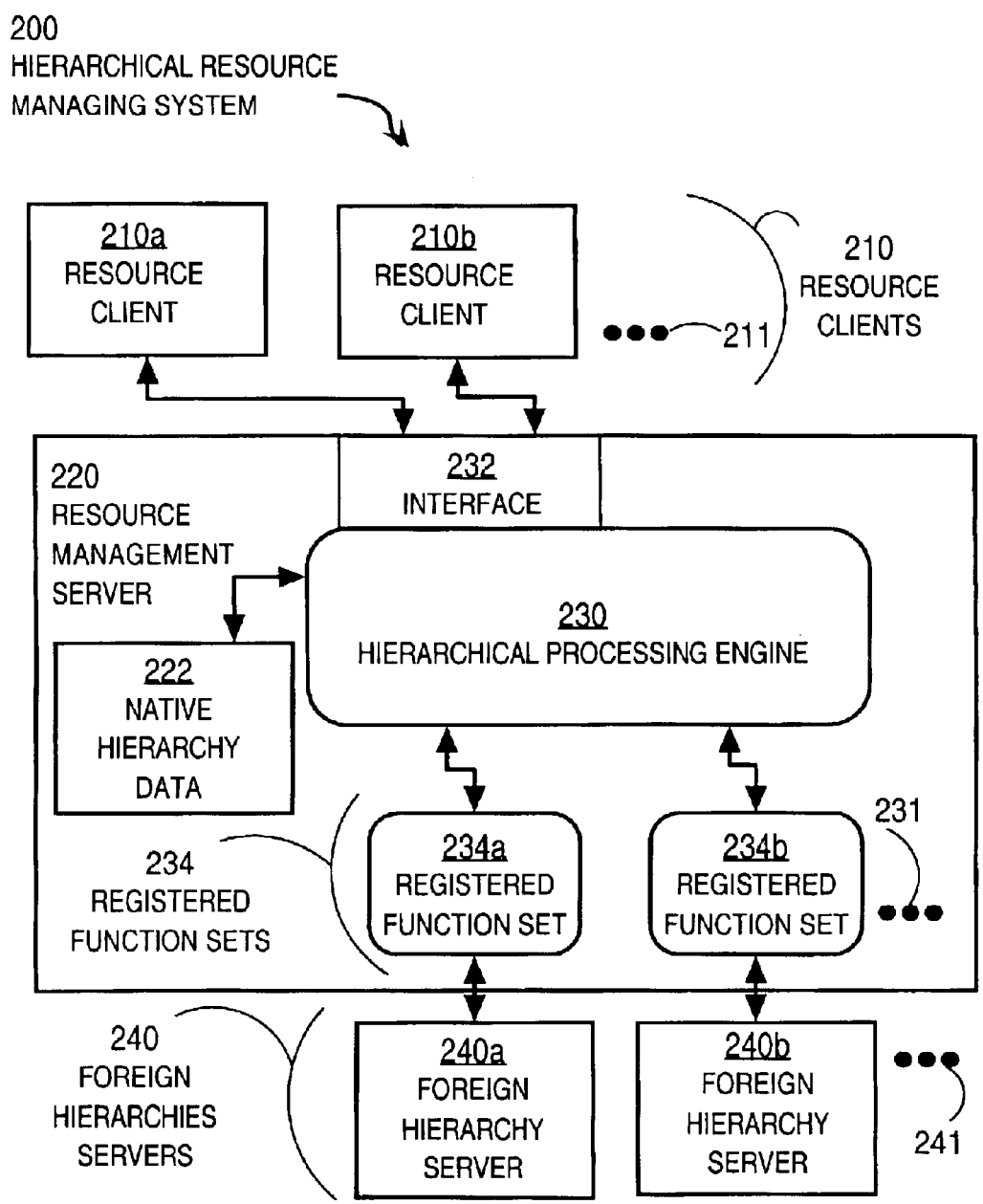
FIG. 2 is a block diagram that illustrates a system for managing resources in multiple hierarchies, according to an embodiment.

FIG. 2 is a block diagram that illustrates a system 200 for managing resources in multiple hierarchies, according to an embodiment. The system 200 includes a resource management server 220, one or more resource clients 210, and one or more foreign hierarchies servers 240.

In the illustrated embodiment, the resource management server 220 is an application that provides file system services for resources in a file system. Well known file system services include listing contents of a folder, creating a resource in a folder, deleting a resource from a folder, getting data from a file, getting properties of a resource, moving a resource from one folder to another, and copying a resource from one folder to another.

Resource clients 210 include any application that requests file system services involving resources in one or more hierarchies from resource management server 220. In the illustrated embodiment, resource clients 210 include resource client 210*a* and resource client 210*b*, among other resource clients represented by ellipsis 211.

Foreign hierarchies servers 240 include any application that provides file system services on resources in a foreign file system. In the illustrated embodiment, foreign hierarchy servers 240 include foreign hierarchy server 240*a* and foreign hierarchy server 240*b*, among other foreign hierarchy servers represented by ellipsis 241. Each foreign hierarchy server 240 includes data representing the resources and links that correspond to the nodes and links of a corresponding foreign hierarchy. In the illustrated embodiment, foreign hierarchy server 240*a* includes the resources and links of foreign hierarchy 102 in FIG. 1, and foreign hierarchy server 240*b* includes the resources and links of foreign hierarchy 103 in FIG. 1. One or more of the foreign hierarchy servers 240 may reside on the same host as the resource management server 220. Any or all of foreign hierarchy servers 240 may reside on one or more hosts different from the host of resource management server 220.

In other embodiments, resource management server 220 is replaced by a data container management server, which is an application that provides services for data containers in other hierarchical systems that might not be file systems, such as XML documents. Services for data containers may include services similar to file system services, such as listing contents of a parent container, creating a child container in a parent container, deleting a child container from a parent container, getting data from a container, getting properties of a container, moving a container from one parent container to another, and copying a container from one parent container to another. In other embodiments, resource clients 210 are replaced by data container clients, which are applications that request data container services involving one or more hierarchies. In other embodiments, foreign hierarchy servers are foreign systems that manage hierarchical data containers, such as foreign file systems and different systems for editing contents of XML documents.

Resource Management Server

The resource management server 220 includes native hierarchy data 222, a hierarchical processing engine 230, a client interface 232, and registered function sets 234, including registered function set 234*a* and registered function set 234*b*, among other registered function sets represented by ellipsis 231.

The native hierarchy data 222 includes the resources and links that correspond to the nodes and links of the native hierarchy, such as hierarchy 101 in FIG. 1. Any method known in the art for representing the native hierarchy, when the resource management server 220 is implemented, may be employed. For example, the data representing resources and links are arranged as described in Agarwal.

The client interface 232 provides access for one or more clients for sending requests for the services of the resource management server 220. The requests sent by clients 210 can be expressed in any manner known in the art. In some embodiments, the requests are messages sent from a client 210 executing on one host to the resource management server 220 executing on a different host over a network using a message exchange protocol. For example, in some embodiments, the requests are file transfer protocol (FTP) requests, well known in the art. In some embodiments, the requests are hypertext transfer protocol (HTTP) requests. In some embodiments, the requests use a protocol called web-based distributed authoring and versioning ("WebDAV") that extends HTTP to support hierarchical operations over the internet that mimic popular file systems. In the system of Agarwal, the messages include a statement in a structured query language (SQL) of a relational database management system that manages hierarchical data representing resources and links in a file system.

In some embodiments, the client requests are not expressed as messages, but as calls to routines specified in an application programming interface (API). Each API is specified for a high level programming language, such as JAVA (hereinafter, called "Java"), C, and a SQL procedural language called PL/SQL. The use of APIs is well known in the art. The API names a routine that can be called by the client and lists the parameter and parameter types used as arguments when the routine is called. According to some embodiments, APIs in several programming languages are provided for obtaining file system services from resource management server 220.

The hierarchical processing engine 230 is a process that determines and executes operations on one or more resources or links of the native hierarchy and the foreign hierarchies, which operations are involved in satisfying the request received from the client 210. The hierarchical processing engine 230 is described in more detail in a later section with reference to FIG. 3.

The registered function sets 234 are processes that make requests for services from the foreign hierarchy servers 240. Data modules, which include instructions that cause a processor to perform the processes of each registered functions set, are registered with the resource management server 220; and those instructions are executed when the hierarchical processing engine 230 invokes a function from the function set. Such modules of instructions that are executed by another process are well known in the art as "plug-in" modules. A method for registering a module for each registered function set is described in a later section with reference to FIG. 3.

In some embodiments, each of one or more of the foreign hierarchies servers 240 is a resource management server, like resource management server 220, which has its own native hierarchy data and registered function sets for one or more hierarchy servers foreign to it.

Using the resource management server 220, a client may interact with the single interface 232 and obtain resources from any of several hierarchies, including the native hierarchy and one or more foreign hierarchies.

Method for Managing Multiple Hierarchies

Figure 3:
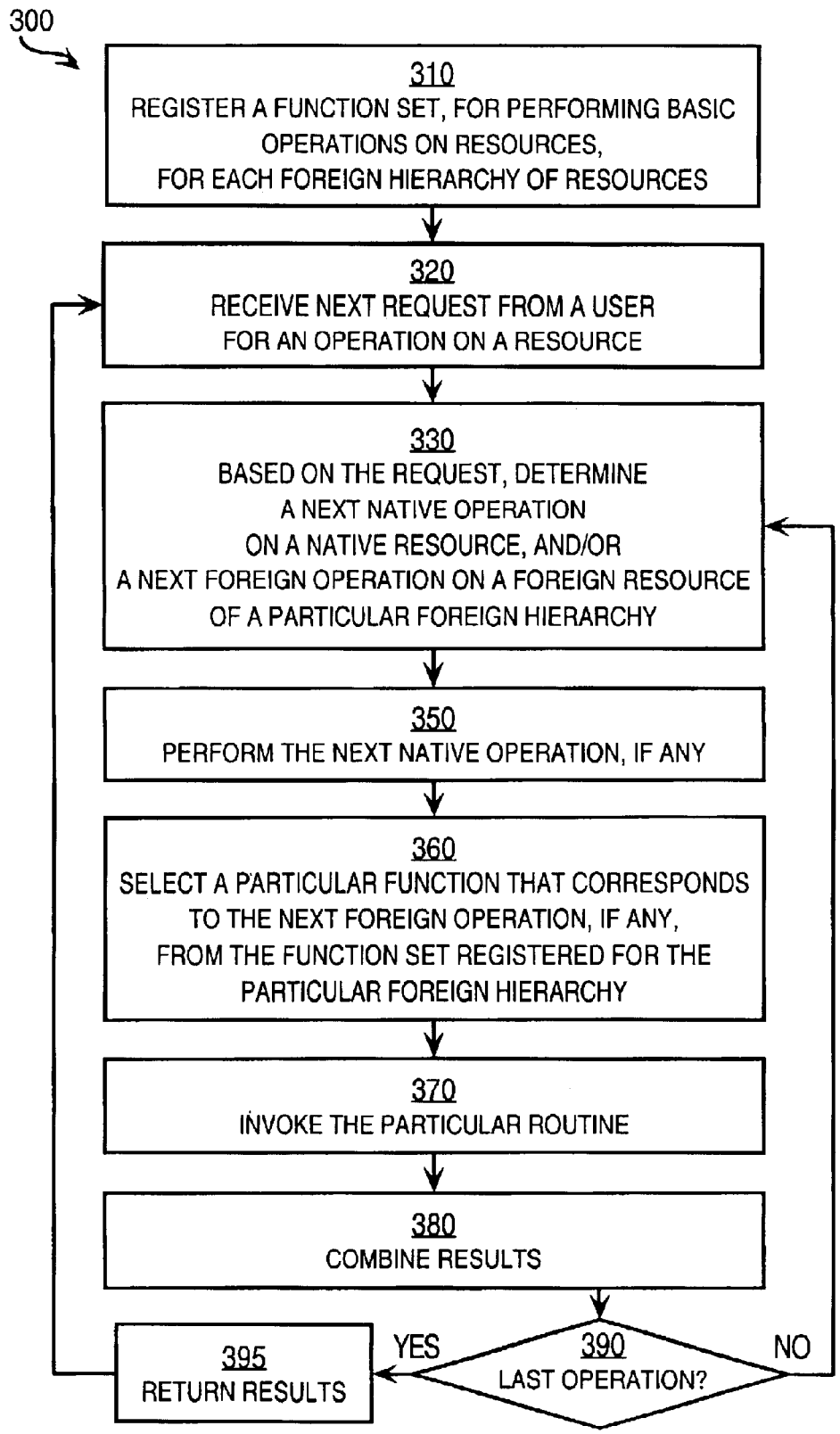
FIG. 3 is a flow diagram that illustrates, at a high level, a method for managing resources in multiple hierarchies, according to an embodiment.

FIG. 3 is a flow diagram that illustrates, at a high level, a method for managing resources in multiple hierarchies, according to an embodiment. Although steps are presented in FIG. 3, in a particular order, in other embodiments the steps may be performed in a different order or overlapping in time.

Register Function Set

In step 310, a function set 234 is registered for each foreign hierarchy of resources to be managed by the resource management server 220. Any method for registering a set of one or more functions with another application may be used. In the illustrated embodiment, an API for function calls made by the hierarchical processing engine 230 is established, and a module that includes instructions matched to that API is provided to resource management server 220 by an integration administrator who wishes to incorporate a foreign hierarchy. Resource management server 220 stores an association between each foreign hierarchy and the corresponding module.

In an illustrated embodiment, the function set includes functions to perform the basic file system operations listed in Table 1.

TABLE 1

Example basic file system operations to be supported by each function set.

| Basic operation name | operand(s) | Description |
| --- | --- | --- |
| get-folder-contents | path name/ folder name | Get a listing of all resources that are children of the operand |
| list-begin | path name/ folder name | Start list of current folder contents |
| list-next | iteration context object | Get next resource that is a child of the current folder |
| list-end | iteration context object | End list of current folder contents |
| get-file-contents | path name/ file name | Get data stream of contents from operand |
| get-resource-properties | path name/ resource name | Get properties of operand stored as metadata associated with the operand |
| get-link-properties | path name | Get properties of last link in operand stored as metadata associated with the last link in operand |
| create-folder | path name/ folder name, folder properties | Create a folder within folder given by first operand, named according to the second operand, with properties given by third operand |
| create-file | path name/ folder name, new file name, file properties data stream | Create a file within folder given by first operand, named according to the second operand, with properties given by third operand, and contents from fourth operand |
| create-link | path name/ folder name, resource name, new link name, link properties | Create a link between folder given by first operand, and resource given by second operand, named according to the third operand, with properties given by fourth operand |
| delete-folder | path name/ folder name | Delete a folder given by operand |
| delete-file | path name/ file name | Delete a file given by operand |
| Rename-resource | path name/ resource name, new path name resource name | Renames a resource given by first operand with name given by second operand (moves resource) |
| copy-resource | path name/ resource name, new path name/ folder name | Copies resource at first operand into folder given by second operand |

In other embodiments, more or fewer operations and corresponding functions may be included in each function set. For example, operations for deleting, renaming, and copying links may be added; or operations for copy and rename can be omitted by substituting a combination of delete and create operations.

In some embodiments, each function in the module has a name that matches the basic operation name and a parameter list that matches the operands. Each function then includes one or more instructions to generate commands that cause the corresponding foreign hierarchy server to perform the operation described in Table 1 for that operation.

During step 310, one or more modules with functions to perform the operations of Table 1 are registered with the resource management server 220 for each foreign hierarchy managed by foreign hierarchy servers 240. In some embodiments, the name of the path or folder where the foreign node is to be linked to the native hierarchy is also specified. In some embodiments, other properties of the foreign hierarchy are also specified when the module is registered. For example, it is specified whether resources in the foreign hierarchy may be modified or not; a resource that can not be modified is said to be "read-only," a resource that can be modified is said to be "modifiable." It may be specified whether a resource or link of the foreign hierarchy can be found by searching on properties or contents of the resource or link; a foreign hierarchy that allows such searches is said to be "searchable." If the foreign hierarchy is searchable, then, in some embodiments, one or more search functions are added to the function set, and a module to invoke the foreign hierarchy's search capability is provided during registration. If the resources or links of the foreign hierarchy can be modified, then it may be specified whether such modifications are committed automatically when made (called "auto-committed"), or are committed only when a transaction of several steps is completed and an explicit commit action is taken, such as invoking a commit function (called "transactional"). In some embodiments, the root node of the foreign hierarchy is associated, by default, with the specified path name to the virtual link. In some embodiments a non-root node of the foreign hierarchy is associated with the virtual link; in such embodiments the path name in the foreign hierarchy to the associated non-root node is also included during registration in step 310.

In some embodiments a mapping is generated during step 310 that associates the function set for one foreign hierarchy with the path name to the virtual link 190 that associates a folder in the native hierarchy with a node in that foreign hierarchy. In some embodiments, the mapping is done at the level of individual functions in the module, so that the functions may be spread over one or more modules, and the function names may differ from the basic operation names in Table 1.

In some embodiments, the link properties of the native hierarchy include attributes that indicate whether the link is a virtual link 190, and, if so, the name of the module where the function set is stored, or a list of the module and functions names of each function in the function set. While traversing a path, when the virtual link is encountered, the operation is performed using the associated module or function on a resource on the portion of the path following the virtual link.

For purposes of illustration, it is assumed that the registration of a function set is done by invoking a routine of the resource management server 220 called "create_virtual_ folder" and specifying the following information as parameters of that routine in the following order:
1. path name where the virtual folder is associated with the native folder;
2. modules and function names for the basic operations in the order of Table 1;

3. flags indicating whether searchable, read-only, and transactional.

In this embodiment, the virtual folder is always the root node of the foreign hierarchy. It is further assumed, for purposes of illustration, that the modules named "Basic 102A" and "Basic 102B" contain the function set for the foreign hierarchy 102 shown in FIG. 1, and foreign hierarchy 102 is neither searchable nor modifiable. Then, foreign hierarchy 102 can be registered with the resource management server 220 for native hierarchy 101 under folder 110e, as shown in FIG. 1, with the following statement:

create_virtual_folder (/L120a/L120d/L190a,
        Basic102A.get_folder,
        Basic102A.begin_folder_list,
        Basic102A.next_in_folder_list,
        Basic102A.end_folder_list,
        Basic102A.get_file,
        Basic102A.get_attributes,
        Basic102B.get_link_attributes,
        Basic102A.no_operation,
        Basic102A.no_operation,
        Basic102A.no_operation,
        Basic102A.no_operation,
        Basic102A.no_operation,
        Basic102A.no_operation,
        Basic102A.no_operation,
        NOT_SEARCHABLE,
        READ_ONLY,
        NULL)

In some embodiments, link names are implied by the resource name of the parent resource and child resource. In such embodiments, the path name "/L120a/L120d/L190a" as the first argument of the create_virtual_folder routine is replaced by the path name "/N110a/N110b/N110e/N130a".

It is further assumed, for purposes of illustration, that the module named "BasicOp103" contains the function set for the foreign hierarchy 103 shown in FIG. 1, and foreign hierarchy 103 is modifiable but not searchable, where the modifications are automatically committed. Then, foreign hierarchy 103 can be registered with the resource management server 220 for native hierarchy 101 under folder 110f, as shown in FIG. 1, with the following statement:

create_virtual_folder (/L120b/L120f/L190b,
        BasicOp103.folder_contents,
        BasicOp103.begin_list,
        BasicOp103.next,
        BasicOp103.end_list,
        BasicOp103.file_contents,
        BasicOp103.attributes,
        Basic102B.link_attributes,
        BasicOp103.new_folder,
        BasicOp103.new_file,
        BasicOp103.add_link,
        BasicOp103.delete,
        BasicOp103.delete,
        BasicOp103.rename,
        BasicOp103.copy,
        NOT_SEARCHABLE,
        MODIFIABLE,
        AUTO_COMMIT)

The result of these registrations is a mapping as summarized in Table 2.

TABLE 2

Example mapping of basic operations to function sets for two foreign hierarchies.

|  | Foreign hierarchy 102 | Foreign hierarchy 103 |
| --- | --- | --- |
| path name | /L120a/120d/L190a | /L120b/120f/L190b |
| searchable | No | No |
| modifiable | No | Yes |
| auto-committed | Not applicable | Yes |
| get-folder-contents | Basic102A.get_folder | BasicOp103.folder_contents |
| list-begin | Basic102A.begin_folder_list | BasicOp103.begin_list |
| list-next | Basic102A.next_in_folder_list | BasicOp103.next |
| list-end | Basic102A.end_folder_list | BasicOp103.end_list |
| get-file-contents | Basic102A.get_file | BasicOp103.file_contents |
| get-resource-properties | Basic102A.get_attributes | BasicOp103.attributes |
| get-link-properties | Basic102B.get_link_attributes | BasicOp103.link_attributes |
| create-folder | Basic102A.no_operation | BasicOp103.new_folder |
| create-file | Basic102A.no_operation | BasicOp103.new_file |
| create-link | Basic102A.no_operation | BasicOp103.add_link |
| delete-folder | Basic102A.no_operation | BasicOp103.delete |
| delete-file | Basic102A.no_operation | BasicOp103.delete |
| rename-resource | Basic102A.no_operation | BasicOp103.rename |
| copy-resource | Basic102A.no_operation | BasicOp103.copy |

Process Client Requests

In step 320, a file system request is received at resource management server 220 from a client 210 to operate on the files and folders in the multiple hierarchies 100. For example, a request is received at interface 232 to list all contents under folder 110e. The request may be received in any manner known in the art, for example in an HTTP/WebDAV message. For example, the request includes the expression, "list all under folder /L120a/L120d/N110e." The desired result of this request is a listing of the names of the resources under that folder, e.g. the name N110g of native file 110g, the name N130a of foreign folder 130a, the name N130b of foreign folder 130b, the name N130c of foreign file 130c, and the names of other resources indicated by ellipsis 131, preceded by appropriate path names.

In step 330, the hierarchical processing engine 230 determines a native operation on a native resource or link, if any, and a foreign operation on foreign resource or link, if any, based on the request. For example, the engine 230 determines that the request to list all involves a next native operation to get contents of folder 110e.

In step 350, the next native operation is performed, which returns identifications for native link 120g to native file 110g and virtual link 190a to foreign folder 130a. It is assumed, for purposes of illustration, that the virtual link 190a is stored in the native hierarchy data 222 and includes the name of the root node of the foreign hierarchy 102. The name of the links and resources are inserted into a results data structure for returning to the client. It is assumed, for purposes of illustration, that the results data structure is updated to include the following, designated R1:

/L120g/N110g,/L190a/N130a            (R1)

In the illustrated embodiment, step 330 overlaps step 350 in time, so that after the native operation is performed in step 350, as described above, the processing engine 230 determines the next foreign operation in step 330. In step 330, the hierarchical processing engine 230 recognizes that native file 110g has no children but that folder 130a might, In the illustrated embodiment, during registration in step 310, described above, a mapping was stored that associates a path ending in link 190a with a function set for foreign hierarchy 102. Thus the hierarchical processing engine 230 knows that folder 130a is a foreign folder for hierarchy 102, because it is under link 190a. Therefore, in the illustrated embodiment, the next foreign operation is a get-folder-contents operation on /L190a/N130a. Using the path name in the mapping in Table 2, it is determined that the foreign operations are those in the middle column of Table 2, which are associated with path name /L120a/120d/L190a.

In step 360, a particular function is selected that corresponds to the next foreign operation from the function set registered for the particular foreign hierarchy. In the illustrated embodiment, the function "Basic102A.get_folder" is selected. As shown in Table 2, "Basic102A.get_folder" corresponds to the basic operation "get-folder-contents" registered for the foreign hierarchy 102 under link 190a.

In step 370, the selected function is invoked. In the illustrated embodiment, the function "Basic102A.get_folder" is invoked with the operand specified for the basic operation, the path name and folder name of the folder. The path name and file name in the operand is below the virtual path 190a that indicates which foreign hierarchy. For example, the function is invoked in the following expression, designated foreign function invocation 1 (FFI1)

Basic 102A.get_folder("/N130a")           (FFI1)

which returns /L140a/130b, L140b/130c.

In step 380, the results from the native and foreign operations are combined with any extant results, adding path names as desired. For example, after step 380, the result data structure includes the following, designated R2.

/L120g/N110g,/L190a/N130a,/L190a/L140a/130b,/
L190a/L140b/130c            (R2)

In step 390, it is determined whether the operations performed in steps 350 and 370 are the last operations involved in fulfilling the request from the client. If not, control passes back to step 330 to determine the next native and foreign operations to perform. For example, after getting the contents of folder 130a in step 370, the hierarchical processing engine 230, should still get the contents of the folder 130b, so control passes back to step 330. In step 330, it is determined that the next operation is to get the contents of folder /L190a/140a/130b. Because this folder is under /L190a, it is a foreign folder in hierarchy 102. Control passes to step 360 to select the correct function to get the folder contents, which again is "Basic102A.get_folder." In step 370, the function is invoked to get the contents of folder /L190a/L140a/N130b using the portion of the path name below L190a, as shown in the following expression, FFI2.

Basic 102A.get_folder("/L140a/N130b")           (FFI2)

Any results obtained are added to the results data structure, in step 380. The loop from steps 330 to step 390 continues until no folder remains in foreign hierarchy 102.

If it is determined in step 390 that the last operation has been performed to satisfy the client request, control passes to step 395. In step 395, the results are returned to the client 210 from the resource management server 220.

In other embodiments, the results of the native operation to get the contents of folder 110e, yields the links to the next nodes but not the node names. The names associated with a node are obtained from the get-resource-properties operation. To get the name of child node on link 120g, a native operation on native node 110g is performed. To get the name of the child node on virtual link 190a, a function associated with a foreign hierarchy has to be invoked. In this case, step 330 involves 1) determining the native function get-resource-properties to obtain the name for node 110g; and 2) determining that a corresponding foreign function should be used to obtain the name for node 130a. Thus a native operation and a foreign operation are determined based on the client request to list the contents of folder 110e.

Example Request: Get File

To further illustrate the use of method 300 for managing resources on multiple hierarchies, a client request to get the contents of a file on hierarchy 102 is described. It is assumed that a user of client 210a knows that file 130c exists on path /L120a/L120d/L190a/L140b/ as a result of the "list all" request described above. In a subsequent request considered here, client 210a sends a request to obtain the contents of this file from resource management server 220.

In step 330, the hierarchical processing engine 230 receives a request to get file contents for /L120a/L120d/L190a/L140b/N130c, and breaks this into a native operation on a native resource and a foreign operation on a foreign resource. Specifically, the hierarchical processing engine 230 determines the native operation:

get-file-contents from /L120a/L120d/L190a and the foreign operation:

get-file-contents from /L140b/N130c.

In step 350, the native operation is performed, if any. Since the path /L120a/L120d/L190a does not indicate a file, no file contents are obtained during step 350.

In step 360, the foreign function corresponding to get-file-contents is selected from the mapping in Table 2. The next hierarchy under L190a is hierarchy 102. Under hierarchy 102, the corresponding foreign function is Basic102A.get_file.

In step 370, the foreign function is invoked on the foreign target /L140b/N130c. The expression formed by the hierarchical processing engine is given by FFI3.

Basic102A.get_file(/L140b/N130c)  (FFI3)

The result of FFI3 is a data stream of contents from file 130c.

In step 380, that data stream is placed into the results data structure. In step 390, it is determined that there are no other operations to perform to satisfy the user request. In step 395, the data stream is sent to the client 210a in one or more messages to client 210a.

Thus a native operation and a foreign operation are determined based on the client request to get the contents of file 130c.

Example Request: Copy File

To further illustrate the use of method 300 for managing resources on multiple hierarchies, a client request to copy a file on hierarchy 102 into a folder in hierarchy 103 is described. It is assumed that a user of client 210a knows that file 130c exists on path /L120a/L120d/L190a/L140b/ as a result of the "list all" request described above. It is further assumed that a user of client 210a knows that folder 150c exists on path /L120b/L120f/L190b/L160b/ as a result of a list all request on folder 110f.

In the request considered here, client 210a sends a request to resource management server 220, to copy a file 130c to folder 150c, using the expression Q1:

Copy /L120a/L120d/L190a/L140b/N130c to /L120b/L120f/L190b/L160b/  (Q1)

In step 330, the hierarchical processing engine 230 receives the request Q1, and breaks this into a sequence of native operations on native resources and foreign operations on foreign resources. Because the source and destination files are not in the same foreign hierarchy, a copy operation cannot be performed in the foreign hierarchy. Instead, a file has to be created in the destination foreign hierarchy 103 based on the file contents in the source foreign hierarchy. In the illustrated embodiment, the hierarchical processing engine 230 determines the following specific sequence of operations:

1. native operation get-resource-properties from /L120a/L120d/L190a;
2. foreign operation get-resource-properties /L140b/N130c under L190a;
3. native operation get-file-contents from /L120a/L120d/L190a;
4. foreign operation get-file-contents from /L140b/N130c under L190a;
5. native operation create-file in folder /L120b/L120f/L190b, with name N130c, current properties, and the data stream from the get-file-contents operation;
6. foreign operation create-file in folder /L160b/150c, with name N130c, current properties, and the data stream from the get-file-contents operation under L190b;

In step 350, the next native operation (1) is performed, if any. Since the path /L120a/L120d/L190a does not indicate a resource, no resource properties are obtained during step 350.

In step 360, the foreign function corresponding to the next foreign operation (2), which is get-resource-properties, is selected from the mapping in Table 2. The hierarchy under L190a is hierarchy 102. Under hierarchy 102, the corresponding foreign function is Basic 102A.get_attributes.

In step 370, the foreign function is invoked on the foreign target /L140b/N130c. The expression formed by the hierarchical processing engine is given by FFI4.

Basic 102A.get_attributes(/L140b/N130c)  (FFI4)

The result of FFI4 is a current attributes data structure of values for attributes for file 130c, such as the owner, the date of creation, among others.

In step 380, no results are stored in the results data structure. No results are returned to a client when a copy operation is performed.

In step 390, it is determined that there are other operations to perform to satisfy the user request; specifically there are the operations 3, 4, 5, 6 listed above.

In the next iteration of step 350, the next native operation (3) is performed. Since the path /L120a/L120d/L190a does not indicate a file, no file contents are obtained during step 350.

In the next iteration of step 360, the foreign function corresponding to the next foreign operation (4), which is get-file-contents, is selected from the mapping in Table 2. The hierarchy under L190a is hierarchy 102. Under hierarchy 102, the corresponding foreign function is Basic102A.get_file.

In step 370, the foreign function is invoked on the foreign target /L140b/N130c. The expression formed by the hierarchical processing engine is given by FFI5 (similar to FFI3, described in the previous section).

Basic102A.get_file(/L140b/N130c)  (FFI5)

The result of FFI5 is a data stream of contents from file 130c.

In step 390, it is determined that there are other operations to perform to satisfy the user request; specifically there are the operations 5, 6 listed above.

In the next iteration of step 350, the next native operation (5) is performed, which is a create-file operation. Since the path /L120a/L120d/L190a does not indicate a folder, no file is created during step 350.

In the next iteration of step 360, the foreign function corresponding to the next foreign operation (6), which is create-file, is selected from the mapping in Table 2. The hierarchy under L190b is hierarchy 103. Under hierarchy 103, the corresponding foreign function is BasicOp103.new_file.

In step 370, the foreign function is invoked on the foreign target /L160b/N150c. The expression formed by the hierarchical processing engine is given by FFI6.

BasicOp103.new_file (/L160b/N150c,N130, properties, data stream)  (FFI6)

Where properties indicates the values in the current attributes data structure. The result of FFI6 is a new file in hierarchy 103 based on the attributes and data stream of contents from file 130c.

Thus several native operations and several foreign operations are determined based on the client request to copy the contents of file 130c in foreign hierarchy 102 to folder 150c in foreign hierarchy 103.

Hardware Overview

Figure 4:
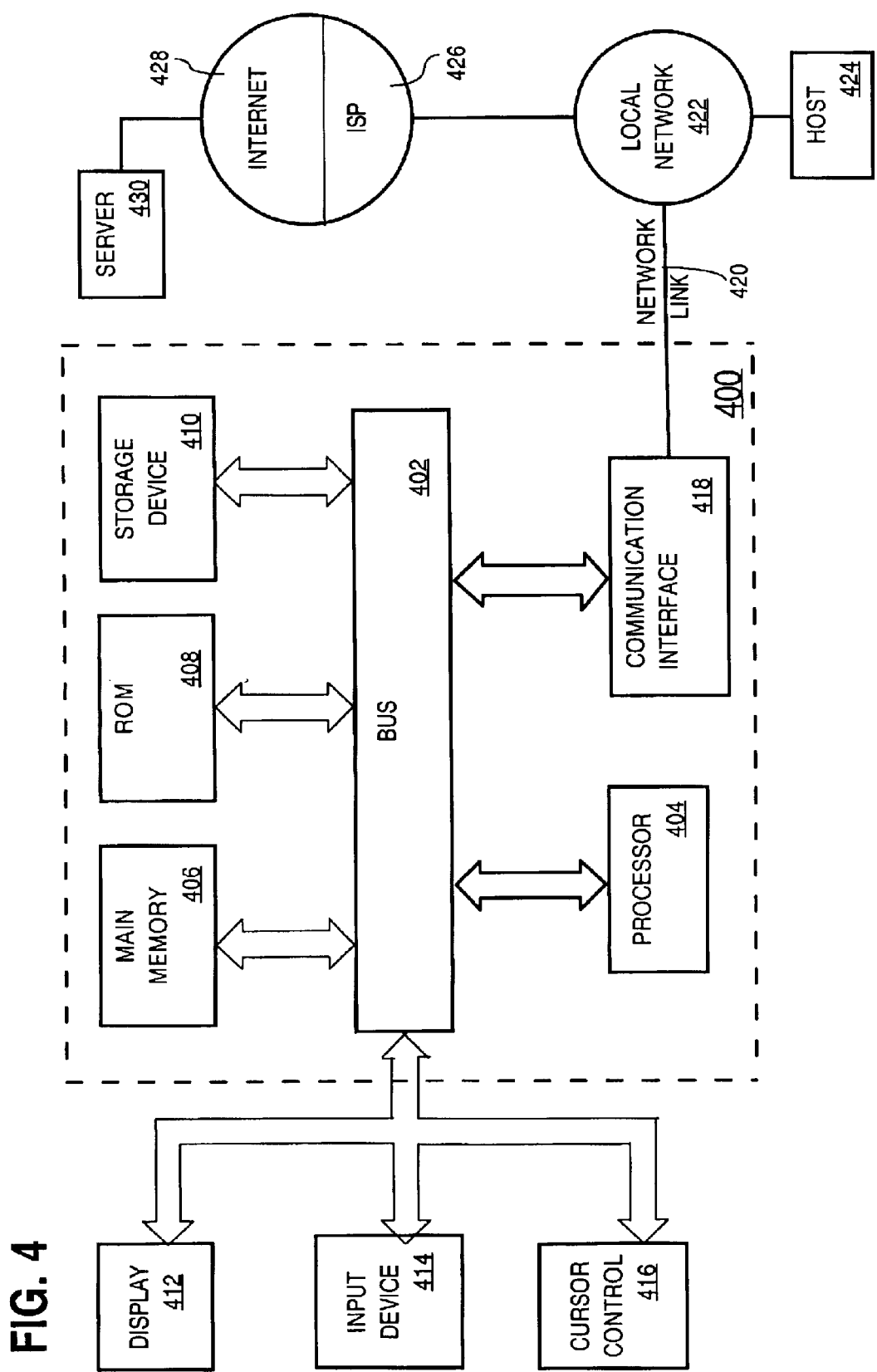
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing a plurality of hierarchies of data containers from a single native hierarchy, each hierarchy including a plurality of nodes, each node corresponding to a data container, the method comprising the steps of:

for each foreign hierarchy that is not the native hierarchy, registering a set of routines for a set of operations, which routines, when invoked, perform one or more operations of the set of operations on one or more data containers in the hierarchy;

wherein the step of registering includes generating a mapping that associates a set of routines with a path to a virtual link that associates a data container in the native hierarchy with a data container in a foreign hierarchy;

receiving a user request that indicates a particular operation on a particular data container that corresponds to a node of a first foreign hierarchy;

based on the user request, determining a first operation to perform on a first set of one or more data containers of the first foreign hierarchy;

selecting, based on the mapping, a first set of routines registered for the first foreign hierarchy;

selecting, from the first set of routines, a particular routine that corresponds to the first operation; and invoking the particular routine to operate on the first set of one or more data containers.

2. The method of claim 1, said step of receiving a user request further comprising the step of:

presenting a single interface to the user with controls for specifying a request to operate on one or more data containers in any of the plurality of hierarchies;

receiving user input based on user activation of at least one of the controls; and forming the user request as a set of one or more operations on one or more data containers, based on the user input.

3. The method of claim 1, wherein the set of operations includes:

an operation to create a data container;

an operation to get data from a data container;

an operation to update data in a data container;

an operation to delete a data container;

an operation to iterate over child containers owned by a parent container;

an operation to copy a data container of one parent data container to another parent data container; and an operation to move a data container from a first parent data container to a second parent data container that is a different data container than the first parent data container.

4. The method of claim 3, wherein the operation to iterate over the child containers includes:

an operation to begin an iteration;

an operation to provide the next child data container; and an operation to end the iteration.

5. The method of claim 1, wherein the first operation is the same as the particular operation.

6. The method of claim 1, wherein the first operation is different from the particular operation.

7. The method of claim 1, further comprising the step of determining, based on the user request, a second operation on a second set of one or more data containers of the native hierarchy.

8. The method of claim 7, wherein the second operation is the same as the particular operation.

9. The method of claim 7, wherein the second operation is different from the particular operation.

10. The method of claim 1, further comprising sending to the user a response including a first result returned from invoking the particular routine.

11. The method of claim 7, further comprising:

combining a first result returned from invoking the particular routine with a second result from the second operation into a response for the user; and sending the response to the user.

12. A computer-readable medium carrying one or more sequences of instructions for managing a plurality of hierarchies of data containers from a single native hierarchy, each hierarchy including a plurality of nodes, each node corresponding to a data container, wherein execution of the one or more sequences of instructions by one or more processors causes the one or more processors to perform the steps of:

for each foreign hierarchy that is not the native hierarchy, registering a set of routines for a set of operations, which routines, when invoked, perform one or more operations of the set of operations on one or more data containers in the hierarchy;

wherein the step of registering includes generating a mapping that associates a set of routines with a path to a virtual link that associates a data container in the native hierarchy with a data container in a foreign hierarchy;

receiving a user request that indicates a particular operation on a particular data container that corresponds to a node of a first foreign hierarchy;

based on the user request, determining a first operation to perform on a first set of one or more data containers of the first hierarchy;

selecting, based on the mapping, a first set of routines registered for the first foreign hierarchy;

selecting, from the first set of routines, a particular routine that corresponds to the first operation; and invoking the particular routine to operate on the first set of one or more data containers.

13. The computer-readable medium of claim 12, said step of receiving a user request further comprising the step of:

presenting a single interface to the user with controls for specifying a request to operate on one or more data containers in any of the plurality of hierarchies;

receiving user input based on user activation of at least one of the controls; and forming the user request as a set of one or more operations on one or more data containers, based on the user input.

14. The computer-readable medium of claim 12, wherein the set of operations includes:

an operation to create a data container;

an operation to get data from a data container;

an operation to update data in a data container;

an operation to delete a data container;

an operation to iterate over child containers owned by a parent container;

an operation to copy a data container of one parent data container to another parent data container; and an operation to move a data container from a first parent data container to a second parent data container that is a differaat data container than the first parent data container.

15. The computer-readable medium of claim 14, wherein the operation to iterate over the child containers includes:
an operation to begin an iteration;
an operation to provide the next child data container; and
an operation to end the iteration.

16. The computer-readable medium of claim 12, wherein the first operation is the same as the particular operation.

17. The computer-readable medium of claim 12, wherein the first operation is different from the particular operation.

18. The computer-readable medium of claim 12, wherein execution of the one or more sequences of instructions further causes the one or more processors to perform the step of determining, based on the user request, a second operation on a second set of one or more data containers of the native hierarchy.

19. The computer-readable medium of claim 18, wherein the second operation is the same as the particular operation.

20. The computer-readable medium of claim 18, wherein the second operation is different from the particular operation.

21. The computer-readable medium of claim 12, wherein execution of the one or more sequences of instructions further causes the one or more processors to perform sending to the user a response including a first result returned from invoking the particular routine.

22. The computer-readable medium of claim 18, wherein execution of the one or more sequences of instructions further causes the one or more processors to perform:
combining a first result returned from invoking the particular routine with a second result from the second operation into a response for the user; and
sending the response to the user.

* * * * *

UNITED STATES PATENT AND TRADEMARK OFFICE
CERTIFICATE OF CORRECTION

PATENT NO.    : 6,947,950 B2
DATED         : September 20, 2005
INVENTOR(S)   : Murthy et al.

It is certified that error appears in the above-identified patent and that said Letters Patent is hereby corrected as shown below:

Column 20,
Line 37, delete "first hierarchy" and insert -- first foreign hierarchy --.

Signed and Sealed this

Eighth Day of November, 2005

JON W. DUDAS
*Director of the United States Patent and Trademark Office*